US005269439A

United States Patent [19]

Ehrle

[11] Patent Number: 5,269,439

[45] Date of Patent: Dec. 14, 1993

[54] DISPENSER LOCK

[76] Inventor: Sylvester L. Ehrle, 1103 Eaton, Richardson, Tex. 75080

[21] Appl. No.: 860,186

[22] Filed: Apr. 27, 1992

[51] Int. Cl.[5] .............................................. B65G 59/00

[52] U.S. Cl. .................................... 221/151; 221/274; 194/235

[58] Field of Search ............... 221/151, 153, 154, 272, 221/274; 194/235, 243, 259

[56] References Cited

U.S. PATENT DOCUMENTS 1,758,390 5/1930 Curtis .................................. 194/235

2,444,747 7/1948 Niewoehner ........................ 221/151

*Primary Examiner*—Robert P. Olszewski
*Assistant Examiner*—Kenneth Noland
*Attorney, Agent, or Firm*—Jack A. Kanz

[57] ABSTRACT

Unauthorized removal of packages from coin-operated vending apparatus is prevented by a gravity operated lock which prevents removal of the ejector from the column of packages in the dispenser. The lock can only be removed from the locking position by movement of the connecting link by which the coin-operated slide moves the ejector to remove packages from the column of packages.

6 Claims, 2 Drawing Sheets

DISPENSER LOCK

Figure 1:
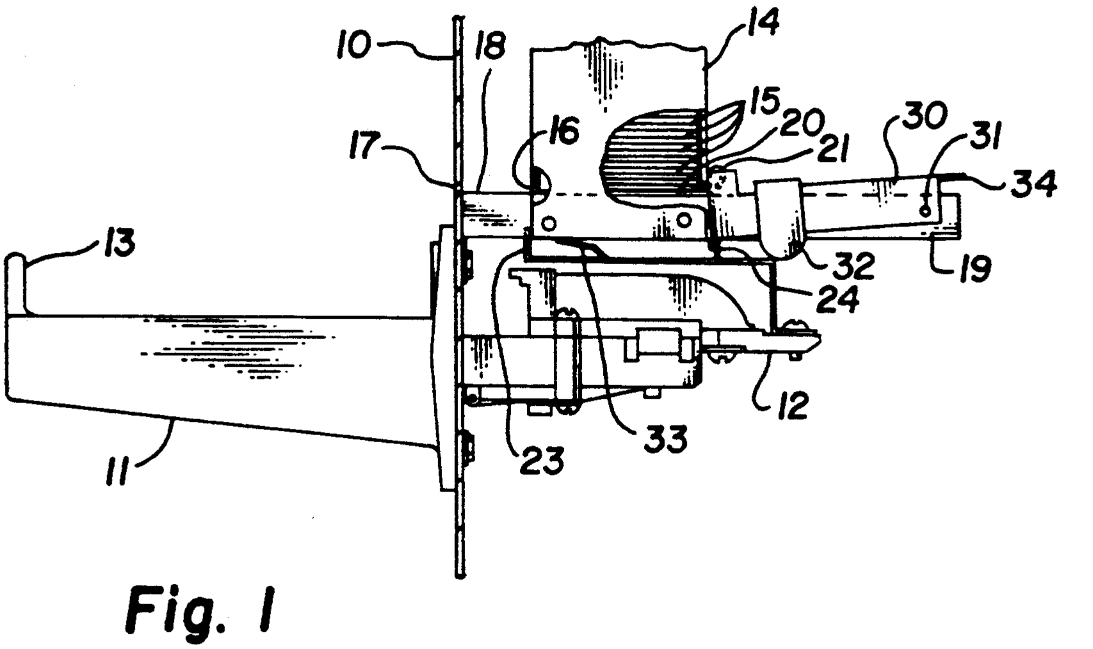

This invention relates to protective locks for coin-operated vending machines. More particularly, it relates to locking devices which prevent manipulation of the package ejectors in coin-operated dispensing apparatus to cause unauthorized removal of packages from the dispenser.

Various dispensers of packaged products have been adapted for operation by coin-activated mechanisms. The product for sale is typically packaged in containers of uniform dimensions which are arranged in a substantially vertical column from which the lower package is removed by a reciprocating ejector. The ejector is activated by a connecting link which cannot be moved until the dispenser is activated by insertion and capture of a coin or the like. Typical of such dispensers are devices for dispensing postage stamps in which a pre-selected number and denomination of stamps is placed in a small rectangular package and the packages arranged in a vertical column or bin. The lowermost package in the bin is aligned with an opening or slot in the front of the dispenser and rests on a floor. An ejector is positioned for reciprocal movement along the floor and has approximately the same dimensions as the package so that when the ejector is positioned adjacent one edge of the package and moved toward the opening, the lowermost package is ejected through the opening. The ejector is then withdrawn, permitting the adjacent package to become the lowermost package. The ejection sequence can then be repeated.

Operation of the ejector is controlled by a coin-activated mechanism which includes a reciprocating slide or plunger adapted to move parallel with the ejector. The slide is connected to the ejector by a connecting link to eject a package when the mechanism has been activated by a coin.

In order to permit capture of the coin before operation of the ejection mechanism, the ejector is not directly connected to the slide. Instead, the slide moves from a first position to a second position to capture the coin. If a coin is captured, the slide is then permitted to move to a third position. A connecting link is used to move the ejector from a first position to a second position and thereby withdraw the ejector from the column only when the slide moves from the second position to a third position. Movement of the ejector into the column to eject the lowermost package is accomplished by withdrawing the slide to the first position. Unfortunately, this arrangement permits unauthorized manipulation of the ejector without full operation of the slide. By simply pushing the slide to the second position (in which the connecting link first engages the ejector) and then inserting a wire hook or the like into the column through the front opening, the ejector may be pushed to the withdrawn position and stamp packages withdrawn by engaging the hook at the remote end of the package and withdrawing the hook. Stamp packages may thus be removed without movement of the coin-operated slide. Similarly, a thin, flat bar having cross-sectional dimensions no greater than the end dimensions of the package may be directly inserted through the front opening to push the ejector to the withdrawn position while the slide is held in the second position. The slide may then be withdrawn to the first position and the ejector will eject the lowermost package. In both cases, packages are removed without insertion of coins.

According to the present invention, unauthorized movement of the ejector is prevented by a pivotally mounted, gravity activated lock which prevents withdrawal of the ejector from the dispenser column except by the connecting link. The lock of the invention is gravity activated so that it remains in place to prevent movement of the ejector until raised by the connecting link itself. Therefore, the coin-operated slide and the connecting link must both move to release the lock before the ejector can be withdrawn from the column, thus preventing unauthorized manipulation of the ejector.

Figure 2:
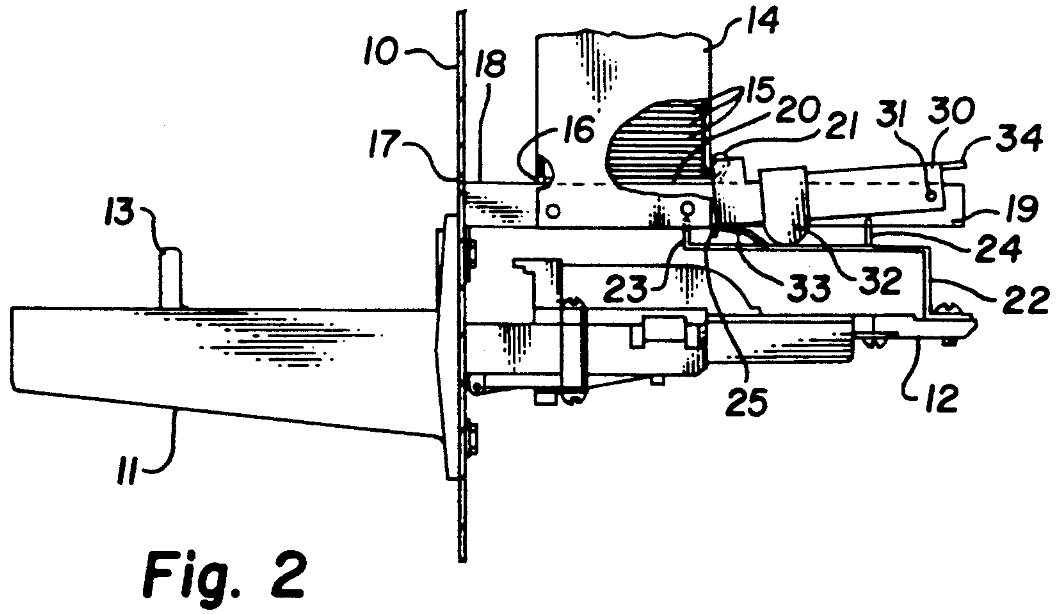
Figure 3:
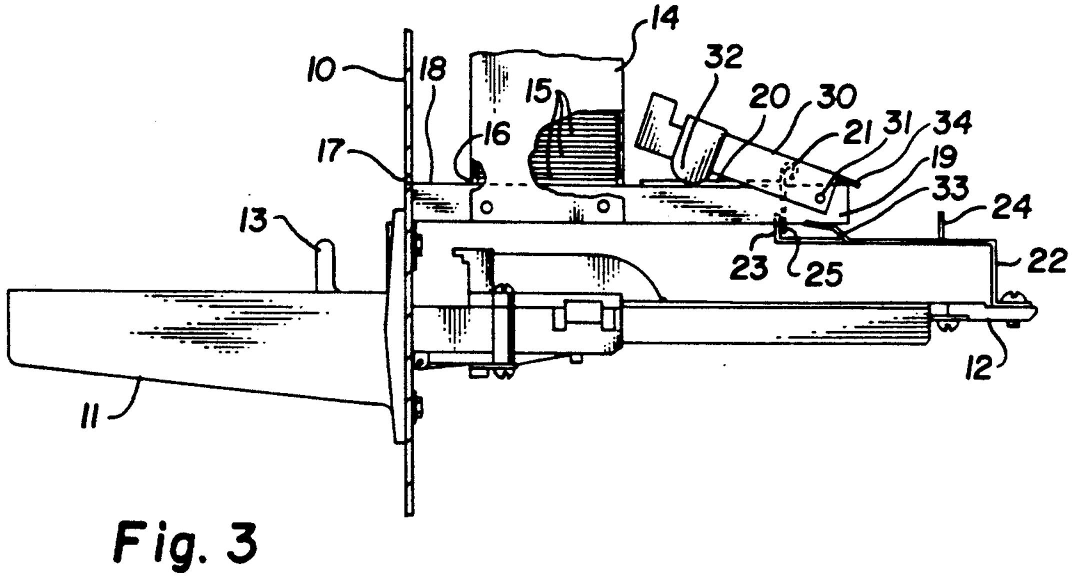

The lock of the invention is gravity operated and can be attached to existing apparatus with only minor modification. Accordingly, the lock device is not only easily installed but prevents theft without complicating any normal operation of the conventional apparatus. Other features and advantages of the invention will become more readily understood from the following detailed description taken in connection with the appended claims and attached drawing in which:

FIG. 1 is an elevational view of a dispensing apparatus employing the lock of the invention showing the positions of the major components thereof in the normal locked position;

FIG. 2 is an elevational view of the apparatus of FIG. 1 illustrating the positions of the components thereof when the slide of the coin-operated mechanism is in the second position from which it may not advance without capturing a coin; and FIG. 3 is an elevational view of the apparatus of FIG. 1 illustrating the positions of the components thereof when the slide has been inserted to the fully extended third position.

The preferred embodiment of the locking device and its operation are illustrated in FIGS. 1-3 in which the locking device is shown installed in a conventional coin-operated stamp vender. The vender comprises an enclosed container having a front wall 10 with an opening in which a conventional coin-activated mechanism 11 is mounted. The coin-activated mechanism 11 is a conventional device which includes a slide 12 having a handgrip 13. The slide 12 is reciprocally moveable between a first (at rest) position as illustrated in FIG. 1 to a second (preload) position as illustrated in FIG. 2. However, the slide 12 cannot be moved to the third (activated) position as shown in FIG. 3 unless an appropriate coin has been captured. Operation of such coin-activated mechanisms is conventional and well known and forms no part of this invention. However, the interconnection of such conventional coin-activated mechanisms to the ejector of the dispenser illustrated is predicated upon operation of the coin-actuated mechanism as described above.

As illustrated in the drawing, a column or bin 14 is arranged vertically adjacent front wall 10. The internal dimensions of bin 14 are suitable to accommodate a vertical stack of packages 15 arranged therein. The column 14 has a front opening 16 aligned with opening 17 in the front face 10. Openings 16 and 17 are sized to substantially conform to the end view dimensions of package 15 so that the lowermost package 15 may be ejected through openings 16 and 17 and presented to the customer.

Bin 14 has a bottom floor 18 formed by the upper surface of a rack 19. The upper surface of rack 19 extends from opening 17 through bin 14 and forms a carrier rack extending within the dispenser enclosure opposite bin 14 and supports a reciprocal ejector 20. Ejector 20 has substantially the same dimensions as a package 15. Accordingly, when the ejector 20 is moved along rack 19 toward front opening 16, the front edge of the ejector engages the lowermost package 15 in the column. The ejector thus replaces the lowermost package 15 and forces the package out through opening 17. When the ejector 20 is moved in the opposite direction, the column of packages settles so that the lowermost package remaining in the column lies adjacent the floor 18 and the sequence can be repeated.

Since the slide 12 must move from the first position (FIGURE 1) to the second position (FIG. 2) to capture a coin, the slide 12 is not connected directly to the ejector 20. Instead, the slide 12 is connected to the ejector 20 by way of a connecting link 22. Connecting link 22 has a pair of upstanding flanges 23 and 24 adapted to alternately engage a downwardly depending flange 25 on the ejector 20. Connecting link 22 is secured to slide 12 and aligned so that flanges 23 and 24 are positioned to move longitudinally with the slide 12 and are spaced apart a distance which substantially corresponds with the distance between the first position of the slide (as shown in FIG. 1) and the second position (as shown in FIG. 2). Downwardly depending flange 25 is positioned between flanges 23 and 24 so that flanges 23 and 24 may selectively alternately engage opposite sides thereof.

The components of the assembly are positioned so that the inner flange 24 engages downwardly depending flange 25 when the slide is in the locked or inactivated position shown in FIG. 1. In this position, the ejector 20 is positioned within the column and occupies the position of the lowermost package in the column. Accordingly, when the slide is moved to the second position (as shown in FIG. 2) the ejector 20 does not move. Instead, inner flange 24 moves away from downwardly depending flange 25 and outer flange 23 approaches downwardly depending flange 25. The outer flange 23, however, does not engage flange 25 until the slide 23 has been released for movement toward the third position by the capture of a coin in the coin-activated mechanism. Obviously, the arrangement of flanges may be reversed without affecting the principles of operation. Unfortunately, it is while the slide is in the second position that ejector 20 can be reciprocally moved between the position shown in FIG. 1 and the position shown in FIG. 3 without engaging the connecting link 22. To prevent such unauthorized movement of the ejector 20, the ejector lock mechanism 30 of the invention is pivotally attached to the extreme end of rack 19 by pin 31 or the like.

As illustrated in the drawing, the lock 30 comprises an elongated member substantially inverted U-shaped in cross-section and pivotally mounted to the extreme inner end of rack 19. The opposite end of ejector lock 30 rests on rack 19 and thus prevents any movement of the ejector 20. Accordingly, so long as the ejector lock 30 remains in the position shown in FIGS. 1 and 2, ejector 20 cannot be removed from bin 14.

Ejector lock 30 carries a cam 32 near the free end thereof which is adapted to engage a ramp 33 carried by the connecting link 22. However, the ramp 33 and cam 32 are positioned so that the ramp 33 does not engage the cam 32 until after the slide 12 has been released for movement between the second position and the third position by capture of a coin. However, after the slide has moved past the second position toward the third position, ramp 33 engages cam 32 and, upon further travel of the slide 12, raises the edge of lock 30 above the lip 21 on ejector 20, thereby permitting ejector 20 to be withdrawn from the bin 14 by engagement of inner flange 24 and downwardly pending flange 25. As illustrated in FIG. 3, lip 21 may engage the undersurface of lock 30 and continue to raise the free end of lock 30 as the ejector 20 is withdrawn from the bin 14. However, when slide 12 is withdrawn, ejector 20 remains stationary until the downwardly depending flange 25 is engaged by inner flange 24. Ejector 20 is then drawn toward the front face 10 by the connecting link 22 and pushes the lowermost package 15 from bin 14 outwardly through opening 17. As the ejector 20 is moved, lock 30 rotates downwardly by gravity and, as soon as lip 21 clears the inner edge of lock 30, the lock 30 drops into the locked position as shown in FIG. 1, preventing withdrawal of the ejector 20 from the bin 14.

It will be noted that since lock 30 is pivoted at its extreme inner end, the lock mechanism is totally gravity activated. Therefore the lock falls into place without intervention of any additional force. Furthermore, the lock is positioned so that it can be raised only after the slide 12 has moved past the second position. In order to assure that the lock 30 always returns to the locked position upon withdrawal of the ejector 20, the lock 30 preferably includes a stop which limits its upward rotation. In the embodiment illustrated, the stop comprises a tail 34 which engages the rack 19 at the point of maximum permissible rotation. Thus, the free end of lock 30 can never be raised above a maximum permissible elevation and the lock 30 will always return to the down and locked position upon withdrawal of the ejector 20 into the bin 14. It will be readily recognized that various other means may be used to limit rotation of the lock 30.

It will be noted that the lock 30 can be readily formed from inexpensive materials and attached to conventional stamp dispensing mechanisms with a minimum of modification. For example, the mechanism shown in FIGS. 1–3 is a conventional apparatus except for the addition of the lock 30 of the invention. The only modification required to install the lock is to make appropriate holes for pin 31 and modification of the end of slide 22 to form lip 21. The connecting link 22 must be replaced or modified to include a ramp 33 which will engage the cam 32 at the appropriate position.

It will be readily recognized that modification of stamp dispensers to include the locking device of the invention can be readily performed at minimum expense. Nevertheless, by installation of the locking device of the invention, losses by unauthorized manipulation of the slide are totally eliminated.

It will be recognized that the invention has been described with specific reference to modification of a stamp vending machine. However, the invention is not so limited. The principles thereof may be applied with similar advantages to other vending devices with similar connecting links between a coin-activated slide and a package ejector. Accordingly, while the invention has been described with particular reference to a specific embodiment thereof, the form of the invention shown and described in detail is to be taken as the preferred embodiment thereof. Various changes and modifications may be resorted to without departing from the spirit and scope of the invention as defined by the appended claims.

What is claimed:

1. In apparatus for dispensing packages from a stack employing an ejector mounted for reciprocal movement between a first position and a second position by a connecting link which employs two spaced apart flanges aligned to alternately engage a flange to move the ejector, a lock comprising:

(a) a lock member mounted for pivotal movement between a locked position wherein it prohibits movement of said ejector from the first position toward the second position and an unlocked position wherein said ejector can be moved toward said second position; and (b) cam means activated by said connecting link to pivot said lock member from the locked position toward the unlocked position.

2. A lock as defined in claim 2 wherein said lock member is an elongated substantially inverted U-shaped body aligned substantially parallel and co-planer with the path of travel of said ejector in said locked position and adapted to pivot to a position which is not co-planar with the path of travel of said ejector.

3. A lock as defined in claim 1 including stop means which limits pivotal movement of said lock member.

4. Apparatus for dispensing packages comprising:

(a) means storing a supply of packages in a substantially vertical column with the lowermost package resting on a floor;

(b) a front wall having an aperture with dimensions substantially corresponding to the end view of one of said packages and aligned with the end of the lowermost package in said column;

(c) a floor supporting said column of packages;

(d) an ejector having dimensions substantially corresponding to one of said packages mounted for reciprocal movement on said floor between a first position in which it is between the lowermost package in said column and said floor and a second position in which it is aligned with the lowermost package and said lowermost package and said ejector are aligned with said aperture with said lowermost package between said aperture and said ejector;

(e) a connecting link adapted to move said ejector from said first position to said second position and from said second position to said first position;

(f) a locking member having a first end and a second end adapted for pivotal rotation about its second end between a locked position in which said locking member prevents movement of said ejector from said first position to said second position and an unlocked position in which said ejector is free to move to said second position; and (g) a cam and a mating ramp, one of each of which is carried on said locking member and the other carried on said connecting link, adapted for engagement and cooperating to move said locking member from said locked position to said unlocked position by movement of said connecting link.

5. Apparatus as defined in claim 4 including stop means which limits pivotal rotation of said locking member.

6. Apparatus as defined in claim 4 wherein said floor comprises a rack supporting said ejector and said locking member is pivotally mounted on said rack.

* * * * *

UNITED STATES PATENT AND TRADEMARK OFFICE

CERTIFICATE OF CORRECTION

PATENT NO. : 5,269,439

DATED : December 14, 1993

INVENTOR(S) : Sylvester L. Ehrle

It is certified that error appears in the above-identified patent and that said Letters Patent is hereby corrected as shown below:

Column 3, line 53, before "lock" insert ---ejector---

Signed and Sealed this

Seventeenth Day of May, 1994

Attest:

BRUCE LEHMAN

Attesting Officer

Commissioner of Patents and Trademarks